(12) United States Patent
Chou et al.

(10) Patent No.: US 9,225,850 B2
(45) Date of Patent: Dec. 29, 2015

(54) HANDHELD ELECTRONIC APPARATUS AND INCOMING CALL PROCESSING METHOD THEREOF

(71) Applicant: Acer Incorporated, New Taipei (TW)

(72) Inventors: Yin-Shan Chou, New Taipei (TW); Cheng-Hsien Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 2 days.

(21) Appl. No.: 13/929,807

(22) Filed: Jun. 28, 2013

(65) Prior Publication Data

US 2014/0171154 A1   Jun. 19, 2014

Related U.S. Application Data

(60) Provisional application No. 61/738,396, filed on Dec. 18, 2012.

(30) Foreign Application Priority Data

Feb. 21, 2013 (TW) .............................. 102106059 A (51) Int. Cl.
*H04M 1/00* (2006.01)
*H04M 19/04* (2006.01)
*H04M 1/725* (2006.01)

(52) U.S. Cl.
CPC .......... *H04M 19/04* (2013.01); *H04M 1/72522* (2013.01)

(58) Field of Classification Search
CPC .................................................. H04M 1/72519

USPC ................................................. 455/550.1, 566
See application file for complete search history.

(56) References Cited

U.S. PATENT DOCUMENTS

| | | | |
|---|---|---|---|
| 2007/0064682 A1* | 3/2007 | Adams et al. | 370/352 |
| 2008/0019494 A1* | 1/2008 | Toda | 379/142.16 |
| 2008/0081569 A1 | 4/2008 | Shiono | |
| 2009/0264117 A1* | 10/2009 | Hsieh et al. | 455/418 |
| 2011/0239156 A1* | 9/2011 | Lin | 715/788 |
| 2011/0239157 A1* | 9/2011 | Lin et al. | 715/788 |
| 2013/0082945 A1* | 4/2013 | Jo | 345/173 |
| 2014/0171154 A1* | 6/2014 | Chou et al. | 455/566 |

FOREIGN PATENT DOCUMENTS

| | | |
|---|---|---|
| CN | 102761665 | 10/2012 |
| EP | 1865716 | 12/2007 |
| EP | 1976244 | 10/2008 |
| GB | 2421154 | 6/2006 |
| TW | 201121292 | 6/2011 |
| WO | 2006043174 | 4/2006 |

OTHER PUBLICATIONS

"Office Action of European Counterpart Application", issued on Mar. 19, 2014, p. 1-p. 6.

* cited by examiner

*Primary Examiner* — Ronald Eisner
(74) *Attorney, Agent, or Firm* — Jianq Chyun IP Office (57) ABSTRACT

A handheld electronic apparatus and an incoming call processing method of the handheld electronic apparatus are provided. When an incoming call is received, a type of an operating interface displayed on a touch display screen is determined; according to the type of the operating interface, it is decided whether to display a sub-call window interface on the operating interface.

4 Claims, 9 Drawing Sheets

HANDHELD ELECTRONIC APPARATUS AND INCOMING CALL PROCESSING METHOD THEREOF

CROSS-REFERENCE TO RELATED APPLICATION

This application claims the priority benefits of U.S. provisional application Ser. No. 61/738,396, filed on Dec. 18, 2012 and Taiwan application serial no. 102106059, filed on Feb. 21, 2013. The entirety of each of the above-mentioned patent applications is hereby incorporated by reference herein and made a part of this specification.

BACKGROUND OF THE INVENTION

1. Field of the Invention

The invention relates to a handheld electronic apparatus and an incoming call processing method thereof. More particularly, the invention relates to a handheld electronic apparatus capable of processing an incoming call without suspending the current task and an incoming call processing method applicable to the handheld electronic apparatus.

2. Description of Related Art

In an era of information technology with rapid development of the electronic industry, electronic information is indispensable in people's lives. It is rather common for users to exchange electronic messages and store electronic data on handheld electronic apparatuses, especially on portable mobile communication apparatuses and personal digital assistants (PDAs). The mobile communication apparatus is, for instance, a mobile phone or an electronic apparatus with a wireless communication function.

With the progress in various hi-tech products derived from computers, mobile communication products, and communication network techniques, manufacturers in the pertinent field are devoted to bringing forth compact, slim, multi-functional hi-tech products and handheld electronic apparatuses with reasonable costs, so as to cater for the demands and preferences of the consumers.

The operating systems of the existing smart phones are all subject to the user's interface which merely displays one interface corresponding to one application program at a time. Hence, in case that a user receives an incoming call while he or she is performing certain tasks on the smart phone, the smart phone is spontaneously switched to the interface for answering the call, so that the tasks are unexpectedly terminated. Since the terminated tasks are not saved, the user is often required to re-perform the tasks after the user hangs up the call.

For instance, if the user who is sending a message through his or her smart phone receives an incoming call, the smart phone is spontaneously switched to the interface for answering the call, and thus the user cannot help but give up on the message he or she was typing. If the typed message has not gone through character selection before the incoming call is received, the typed message is gone after the call ends, which causes considerable inconvenience to the user who has no choice but to re-type the message.

Besides, during the conversation over the phone, if the user intends to perform functions relevant to the talk, such as volume adjustment, talk mode change, end of the conversation, or the like, the user has to give up on the current task and switches to the call interface, which hinders the use of the smart phone.

SUMMARY OF THE INVENTION

The invention is directed to a handheld electronic apparatus and an incoming call processing method thereof, whereby a user is allowed to answer an incoming call without affecting the task that the user is performing prior to the incoming call. This significantly facilitates the use of the handheld electronic apparatus.

In an embodiment of the invention, an incoming call processing method that is configured for a handheld electronic apparatus with a touch display screen is provided. The incoming call processing method includes following steps. When an incoming call is received, a type of an operating interface displayed on the touch display screen is determined. According to the type of the operating interface, whether to display a sub-call window interface on the operating interface is decided.

In an embodiment of the invention, a handheld electronic apparatus that includes a touch display screen and a processing unit is provided. The processing unit is coupled to the touch display screen. When receiving an incoming call, the processing unit determines a type of an operating interface displayed on the touch display screen and determines whether to display a sub-call window interface on the operating interface according to the type of the operating interface.

In view of the above, according to an embodiment of the invention, while a call is incoming, a sub-call window interface is displayed on the operating interface of the current task, such that the user is allowed to answer or deny the call through the sub-call window interface without suspending the task that the user is performing. This significantly facilitates the use of the handheld electronic apparatus.

Several exemplary embodiments accompanied with figures are described in detail below to further describe the invention in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DETAILED DESCRIPTION OF DISCLOSED EMBODIMENTS

Figure 1:
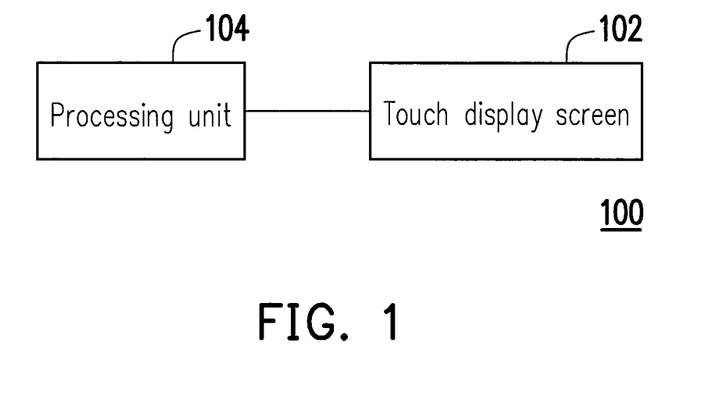
FIG. 1 is a schematic diagram illustrating a handheld electronic apparatus according to an embodiment of the invention.
Figure 2:
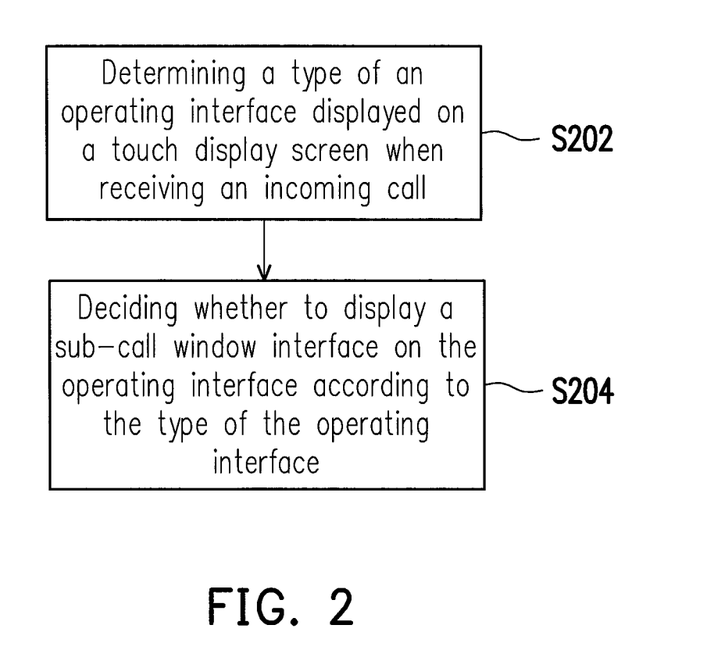
FIG. 2 is a schematic flowchart illustrating an incoming call processing method according to an embodiment of the invention.

FIG. 1 is a schematic diagram illustrating a handheld electronic apparatus according to an embodiment of the invention. With reference to FIG. 1, the handheld electronic apparatus 100 may be a smart phone, a tablet PC, a notebook computer, a satellite navigation apparatus, or any other electronic communication products, for instance, and the handheld electronic apparatus 100 includes a touch display screen 102 and a processing unit 104 that is coupled to the touch display screen 102. The touch display screen 102 serves to display image frames and senses and detects the operation by input tools. Here, the input tool may be a finger, a stylus, or any other tool that can perform a touch operation on the touch display screen 102. The processing unit 104 may be employed to process an incoming call to the handheld electronic apparatus 100 in the manner depicted in FIG. 2. First, in step S202, a type of an operating interface displayed on the touch display screen 102 is determined when an incoming call is received. Here, the type of the operating interface displayed on the touch display screen 102 may include a full-screen call interface, a screen-locking interface, a standby interface, and a normal application operating interface. Through the normal application operating interface, a user is able to write a message, browse a website, broadcast multimedia files, and so on, for instance. That is, the normal application operating interface includes any operating interface other than the full-screen call interface, the screen-locking interface, and the standby interface. In step S204, it is decided whether to display a sub-call window interface on the operating interface according to the type of the operating interface.

Figure 3A:
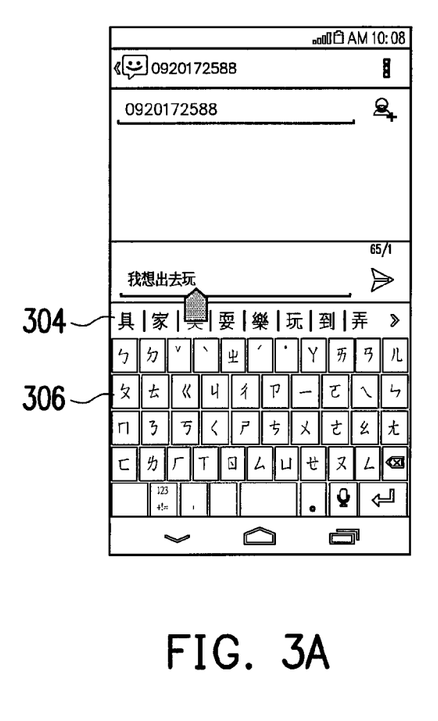
FIG. 3A to FIG. 3C are schematic diagrams illustrating an incoming call processing operation according to an embodiment of the invention.
Figure 3B:
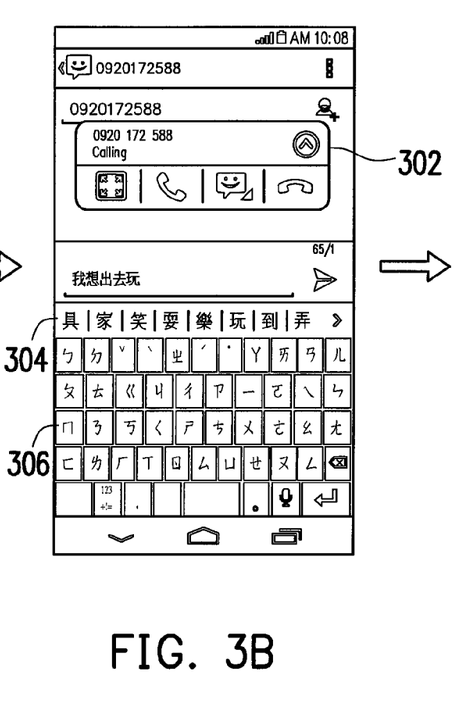
Figure 3C:
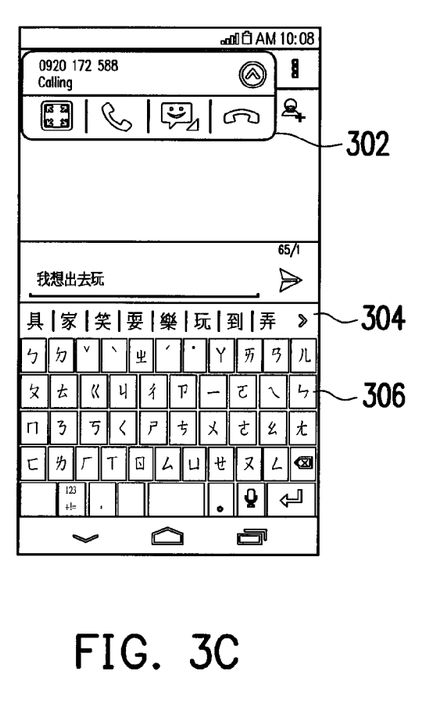

FIG. 3A to FIG. 3C are schematic diagrams illustrating an incoming call processing operation according to an embodiment of the invention. With reference to FIG. 3A to FIG. 3C, the operating interface on the handheld electronic apparatus 100 for editing a message is shown in FIG. 3A. If the processing unit 104 receives an incoming call and determines that the operating interface displayed on the touch display screen 102 refers to the normal application operating interface, the processing unit 104 manages to display the sub-call window interface on the operating interface for editing the message, as shown in FIG. 3B. The sub-call window interface 302 includes several control keys for controlling the communication operation, and the detailed arrangement of the control keys will be provided hereinafter. As illustrated in FIG. 3A and FIG. 3B, even though the processing unit 104 receives the incoming call while editing the message, neither the character selection bar 304 nor the keyboard layout 306 disappears in response to the incoming call. That is, the original operating interface for editing the message is covered by the sub-call window interface 302. In an embodiment of the invention, an input tool (e.g., a finger or a stylus) may be applied to perform a touch action on the sub-call window interface 302, so as to drag the sub-call window interface 302 onto a different location on the touch display screen 102, as shown in FIG. 3C. Here, the touch action includes a sliding action.

Figure 4A:
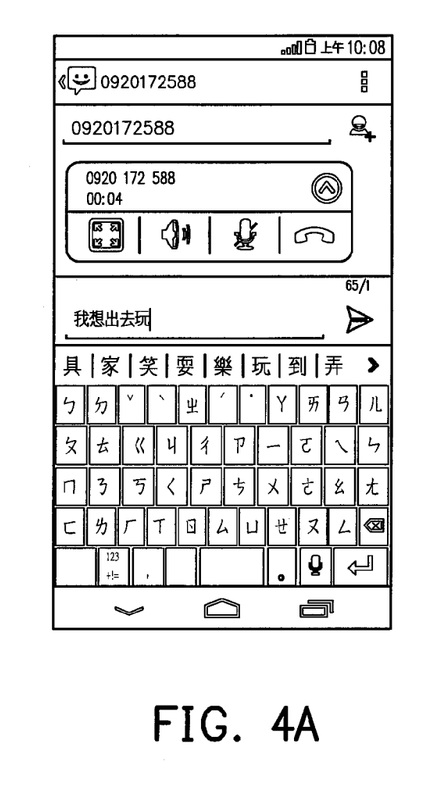
FIG. 4A to FIG. 4C are schematic diagrams illustrating an incoming call processing operation according to another embodiment of the invention.
Figure 4B:
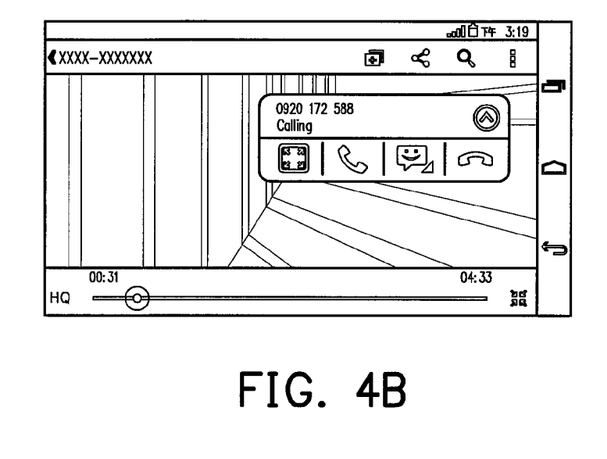
Figure 4C:
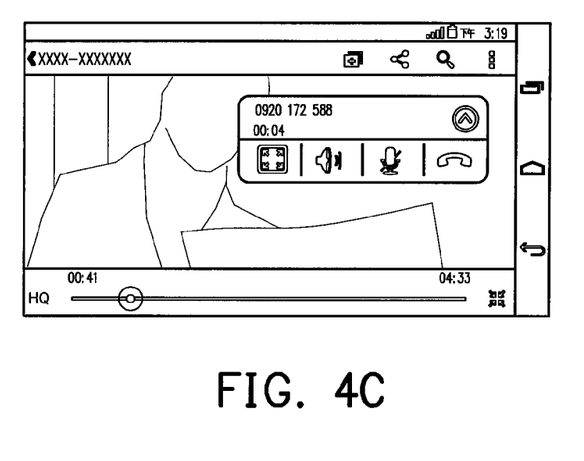

FIG. 4A to FIG. 4C are schematic diagrams illustrating an incoming call processing operation according to another embodiment of the invention. With reference to FIG. 4A to FIG. 4C, if the processing unit 104 receives the incoming call while editing the message, the message-editing task is not interrupted (as shown in FIG. 4A); what is more, the processing unit 104 may further execute other applications according to the operation performed by the input tool. As illustrated in FIG. 4B, through the operation performed by the input tool, the processing unit 104 originally editing the message may turn to play video files. After the processing unit 140 turns to play the video file, the processing unit 104 may continue to receive the operation from the input tool and thereby perform relevant broadcasting functions. For instance, as shown in FIG. 4C, the processing unit 104 may, through the operation performed by the input tool, drag the time bar through to 00:41 and play the video file.

Figure 5:
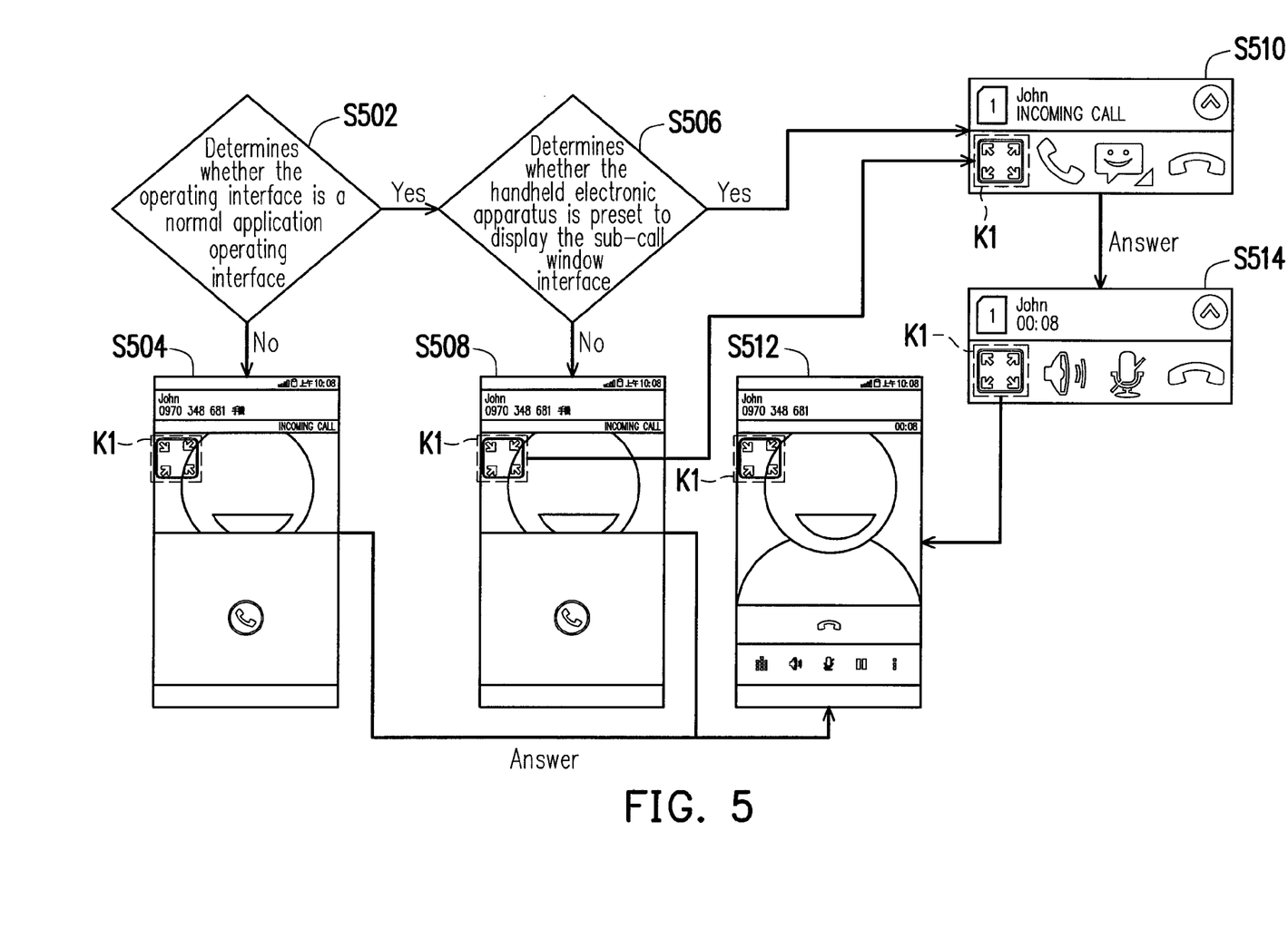
FIG. 5 is a schematic flowchart of determining whether to display a sub-call window on an operating interface according to another embodiment of the invention.

FIG. 5 is a schematic flowchart of determining whether to display a sub-call window on an operating interface according to another embodiment of the invention. Specifically, the step of deciding whether to display the sub-call window interface on the operating interface according to the type of the operating interface by the processing unit 104 may also include steps shown in FIG. 5. That is, in step S502, the processing unit 104 determines whether the operating interface is the normal application operating interface; if the operating interface is not the normal application operating interface but the screen-locking interface or the standby interface, the processing unit 104 controls the touch display screen 102 to directly display the full-screen call interface in step S504. If the operating interface is the normal application operating interface, the processing unit 10 determines whether the handheld electronic apparatus 100 is preset to display the sub-call window interface in step S506. If the handheld electronic apparatus 100 is not preset to display the sub-call window interface, the processing unit 104 controls the touch display screen 102 to display full-screen call interface in step S508; if the handheld electronic apparatus 100 is preset to display the sub-call window interface, the processing unit 104 controls the touch display screen 102 to display the sub-call window interface on the operating interface that is originally displayed (step S510).

Figure 6A:
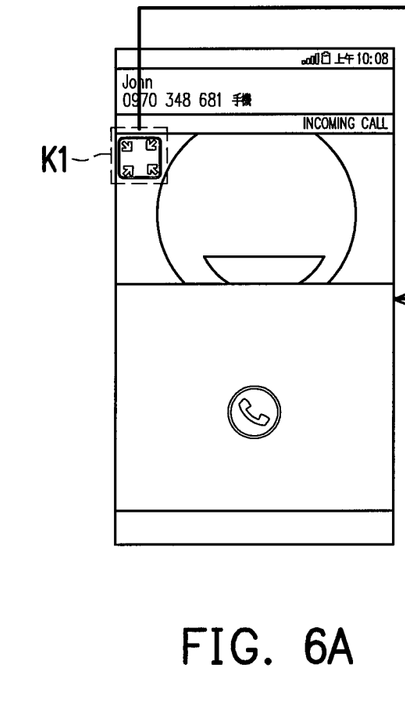
FIG. 6A to FIG. 6C are schematic diagrams illustrating an operation of a sub-call window interface according to an embodiment of the invention.
Figure 6B:
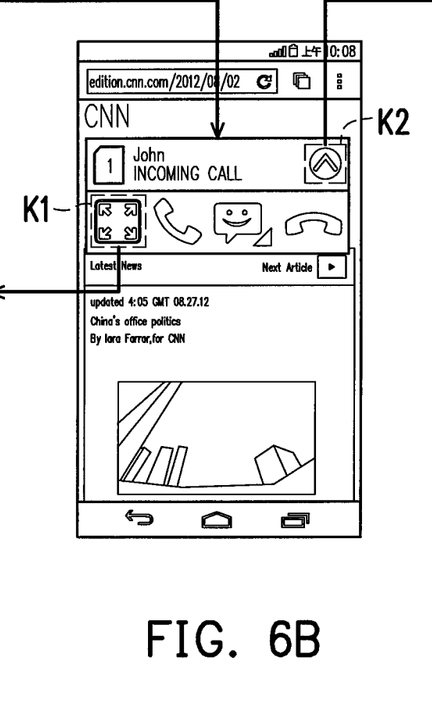
Figure 6C:
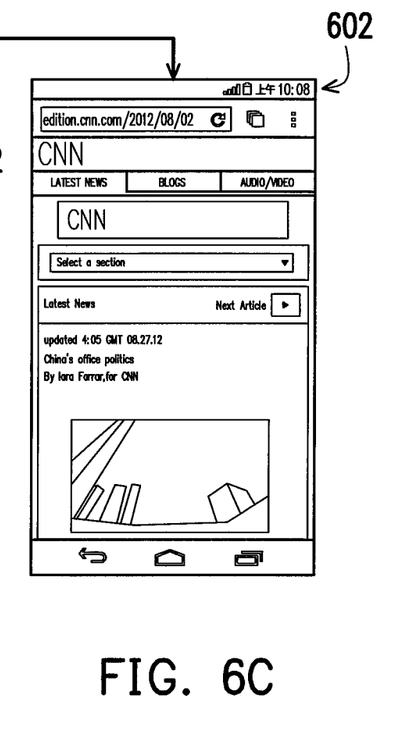

The full-screen call interface includes a call interface switching control key K1 that may switch the full-screen call interface to the sub-call window interface, as shown in FIG. 5. When a user uses an input tool to perform a touch action (e.g., a touch and click-on action) on the call interface switching control key K1 on the touch display screen 102, the processing unit 104 controls the touch display screen 102 to downsize the full-screen call interface to the sub-call window interface shown in step S510. FIG. 6A to FIG. 6C are schematic diagrams illustrating an operation of a sub-call window interface according to an embodiment of the invention. In the embodiment depicted in FIG. 6A to FIG. 6C, the processing unit 104 executes the webpage browsing program (shown in FIG. 6B and FIG. 6C) while receiving the incoming call, and the touch display screen 102 displays the webpage browsing interface. A user uses an input tool to perform a touch action on the call interface switching control key K1, such that the operating interface is switched between the full-screen call interface (shown in FIG. 6A) and the sub-call window interface (shown in FIG. 6B). When the operating interface is switched to the sub-call window interface, the sub-call window interface merely covers one portion of the webpage browsing interface, while the other portion not covered by the sub-call window interface still displays the image frame of the webpage browsing interface. The user still can manipulate the objects on the webpage browsing interface.

Besides, if the user answers the incoming call when the operating interface is switched to the full-screen call interface, the touch display screen 102 displays the full-screen call interface that indicates the user is on the phone line (as described in step S512); similarly, if the user answers the incoming call when the operating interface is switched to the sub-call window interface, the touch display screen 102 displays the sub-call window interface that indicates the user is on the phone line (as described in step S514). In addition, after the incoming call is answered, the touch action can still be performed on the call interface switching control key K1 to switch between the full-screen call interface and the sub-call window interface.

Figure 7:
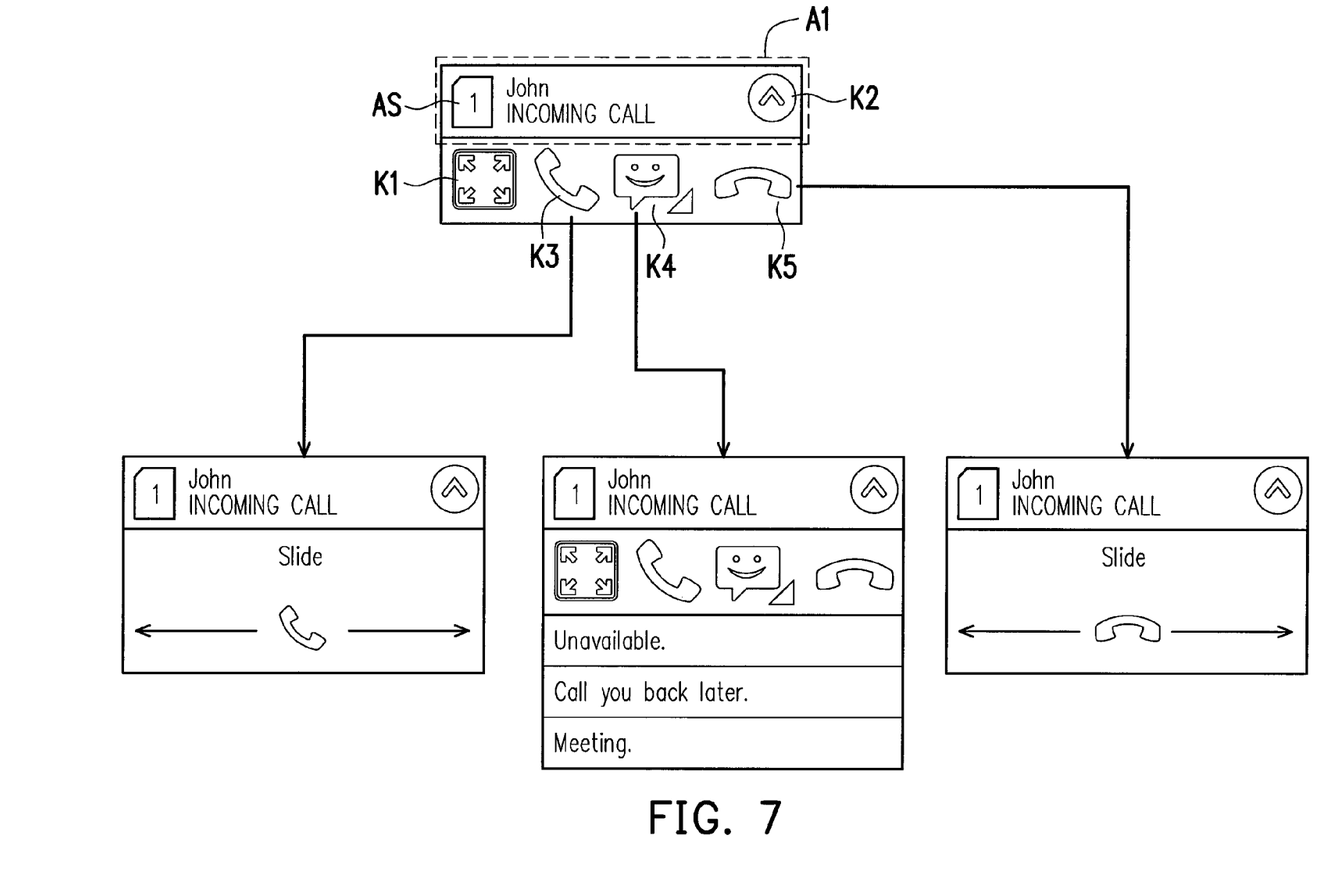
FIG. 7 is a schematic diagram illustrating an operation of a sub-call window interface according to an embodiment of the invention.

FIG. 7 is a schematic diagram illustrating an operation of a sub-call window interface according to an embodiment of the invention. With reference to FIG. 7, specifically, the sub-call window interface not only contains the call interface switching control key K1 but also includes a status display bar A1, a sub-call window zooming control key K2, an answer control key K3, a message sending control key K4, and a hang-up control key K5. The status display bar A1 may display the caller's ID (as marked by "John" in FIG. 7), the state of the call (as marked by "INCOMING CALL" in FIG. 7), and the SIM card in use (as marked by "As" in FIG. 7). If the handheld electronic apparatus merely uses one single SIM card, the display of the SIM card information may be omitted. In another embodiment, the status display bar A1 may also display other information. For instance, when the user hangs up the phone, the status of the call "CALL ENDED" may be displayed; when the user makes an outgoing call, the status of the call "DIALING" and the name of the receiver may be displayed.

The sub-call window zooming control key K2 serves to hide the sub-call window interface and prevent the sub-call window interface from blocking the operating interface displayed on the touch display screen 102. As shown in FIG. 6C, the sub-call window interface may be hidden in a notification bar 602, such that the touch display screen 102 is allowed to display the entire webpage browsing interface. At this time, the conversation during the incoming call has not ended yet, while the operating interface corresponding to the incoming call is hidden. The user can recover the call window interface at any time through the notification bar 602.

The answer control key K3 is employed to answer the incoming call, and the hang-up control key K5 is employed to hang up the incoming call. In the present embodiment, a touch action that includes a sliding action is performed on the answer control key K3 or the hang-up control key K5 with use of an input tool, so as to control and operate the answer control key K3 or the hang-up control key K5. The touch action that includes the sliding action may be performed by using the input tool to touch the touch display screen 102 and sliding the input tool to the left, to the right, to the left and then to the right, or to the right and then to the left, which should however not be construed as a limitation to the invention. Thereby, the issue that the user erroneously answers or hangs up the incoming call because he or she unintentionally touches the answer control key K3 or the hang-up control key K5 may be resolved. The message sending control key K4 is used to send a default message to a caller. As shown in FIG. 7, a user may touch and click on the message sending control key K4 with use of an input tool, so that the touch display screen 102 displays a drop-down menu which shows the default messages, such as "Unavailable.", "Call you back later.", "Meeting.", and so on. The invention is not limited thereto.

Figure 8:
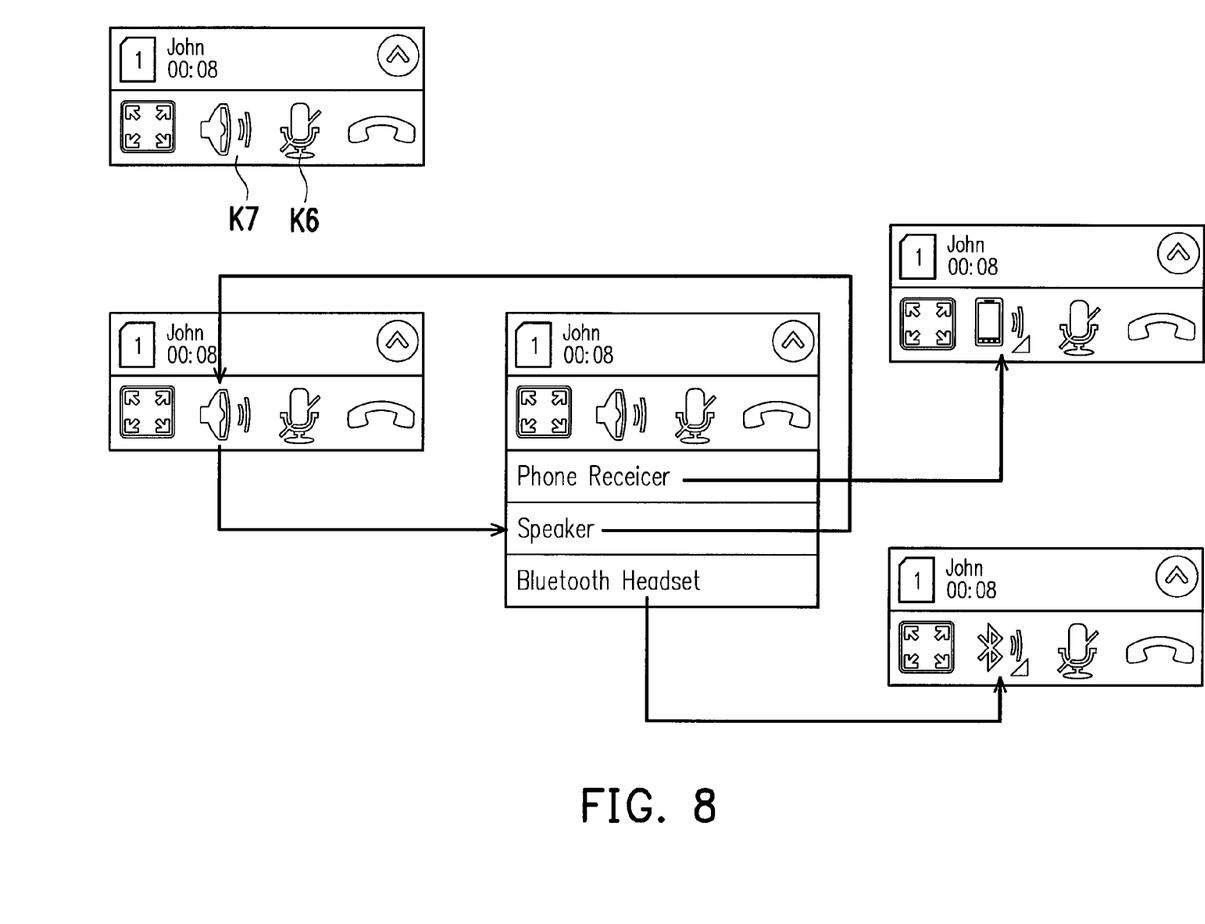
FIG. 8 is a schematic diagram illustrating an operation of a sub-call window interface according to another embodiment of the invention.

FIG. 8 is a schematic diagram illustrating an operation of a sub-call window interface according to another embodiment of the invention. With reference to FIG. 8, the present embodiment is directed to the sub-call window interface that is displayed after the incoming call is answered. As shown in FIG. 8, after answering the incoming call, the processing unit 104 controls the touch display screen 102 to convert the answer control key K3 and the message sending control key K4 into a talk mode control key K6 and a mute control key K7. Besides, the status display bar A1 may exhibit the talk time. The talk mode control key K6 serves to control a switching action among different talk modes. As shown in FIG. 8, a user may touch and click on the call mode control key K6 with use of an input tool, such that the touch display screen 102 displays a drop-down menu to show the available talk modes, e.g., a Speaker mode, a Bluetooth® Headset mode, a Phone Receiver mode, etc. The mute control key K7 is utilized to disable or enable the microphone of the handheld electronic apparatus 100. Besides, in the present embodiment, the way to operate the hang-up control key K5 may be a simple touch and click-on action; however, the way to operate the hang-up control key K5 may also include a sliding action and should not be limited to that described herein.

Figure 9A:
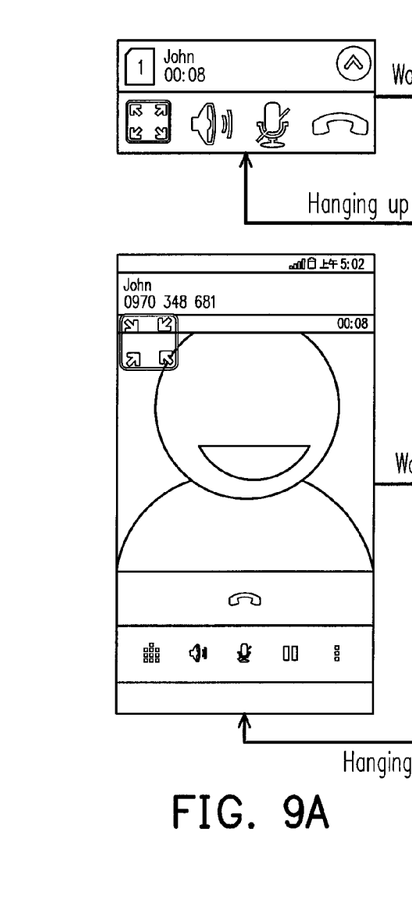
FIG. 9A to FIG. 9C are schematic diagrams illustrating an incoming call processing operation according to another embodiment of the invention.
Figures 9B, 9C:
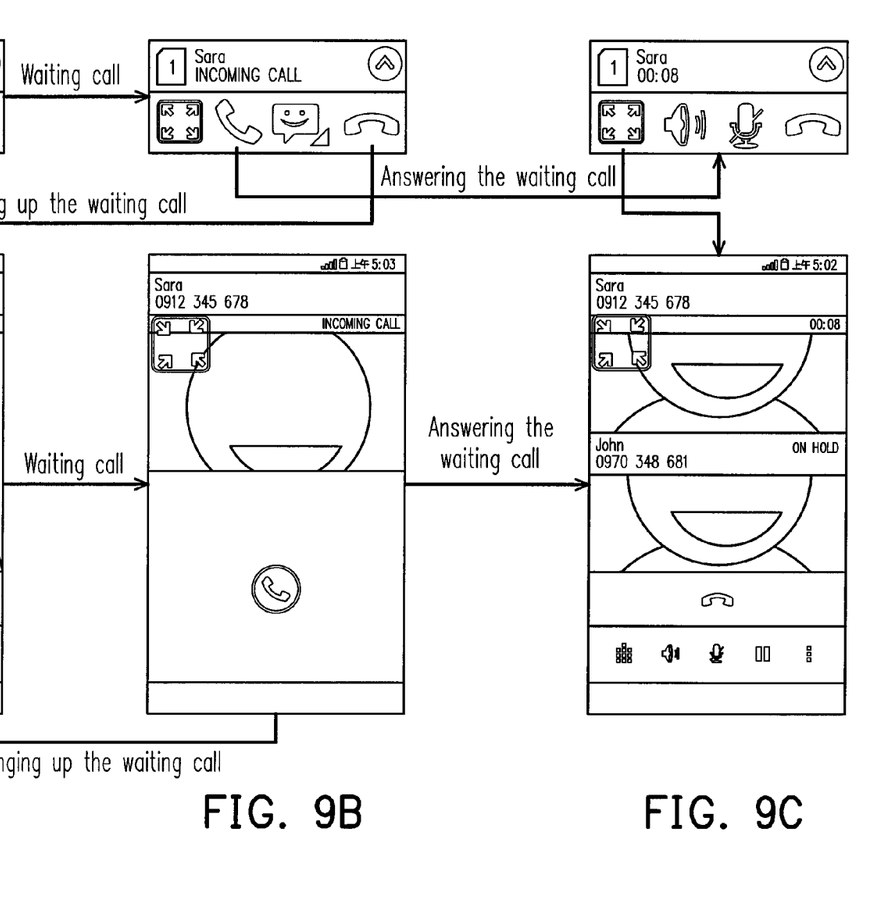

FIG. 9A to FIG. 9C are schematic diagrams illustrating an incoming call processing operation according to another embodiment of the invention With reference to FIG. 9A to FIG. 9C, the present embodiment is directed to the receipt of another incoming call while one incoming call is being answered. As shown in FIG. 9A, after the incoming call is answered, the sub-call window interface displayed on the touch display screen 102 is similar to that depicted in FIG. 8, and the answer control key K3 and the message sending control key K4 are also converted into the talk mode control key K6 and the mute control key K7. When the processing unit 104 receives another incoming call, the processing unit 104 controls the touch display screen 102 to display the caller's ID (as shown by "Sara" in FIG. 9B), and the processing unit 104 converts the talk mode control key K6 and the mute control key K7 back into the answer control key K3 and the message sending control key K4, as shown in FIG. 9B, so as to decide whether to answer/hang up the waiting call or send a message to the caller of the waiting call. The details in this regard are provided in the embodiment shown in FIG. 7 and thus will not be further described herein. After answering the waiting call, the processing unit 104 controls the touch display screen 102 to once again convert the answer control key K3 and the message sending control key K4 into the talk mode control key K6 and the mute control key K7, as shown in FIG. 9C. On the contrary, if the user selects to hang up the waiting call, the call interface is switched to the operating interface shown in FIG. 9A. During the waiting call, the user may control and operate the call interface switching control key K1 by means of an input tool at any time, so as to switch the call interface to the full-screen call interface or to the sub-call window interface. In case of the full-screen call interface, the state of the caller ("Sara") of the waiting call and the state of the caller ("John") of the first incoming call may be both displayed when the waiting call is answered.

Figure 10:
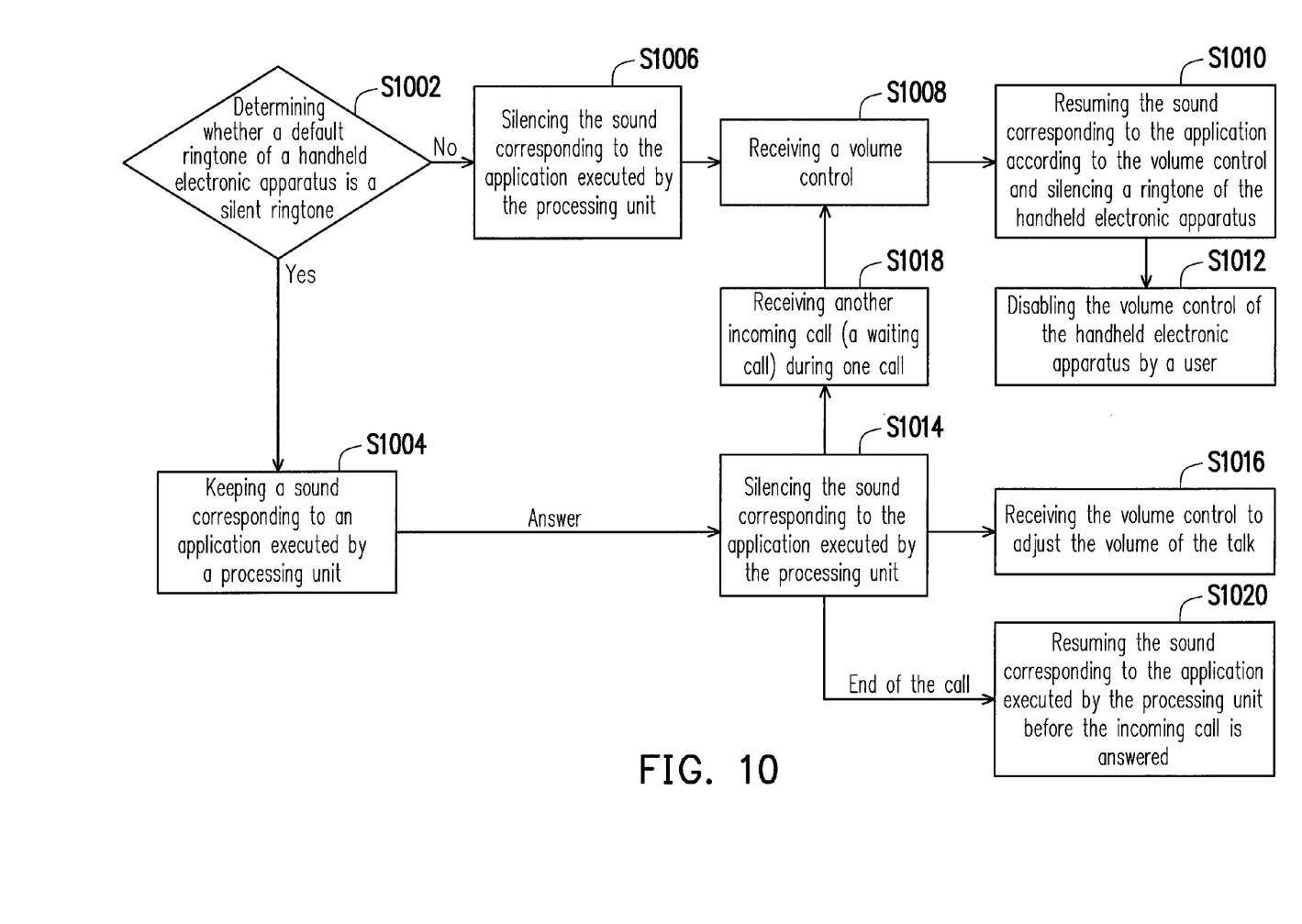
FIG. 10 is a schematic flowchart illustrating an incoming call processing method according another an embodiment of the invention.

FIG. 10 is a schematic flowchart illustrating an incoming call processing method according to another an embodiment of the invention. With reference to FIG. 10, in the present embodiment, the way in which the processing unit 104 processes a ringtone or a sound corresponding to the incoming call is described. As shown in FIG. 10, when the processing unit 104 receives an incoming call, the processing unit 104 in step S1002 determines whether a default ringtone of the handheld electronic apparatus 100 is silent; if the default ringtone setting of the handheld electronic apparatus 100 is silent, in step S1004, the processing unit 104 does not change a sound corresponding to an application executed by the processing unit 104. By contrast, if the default ringtone of the handheld electronic apparatus 100 is not silent, the processing unit 104 silences the sound corresponding to the application executed by the processing unit 104 in step S1006. At this time, if the user executes a volume control, e.g., presses a volume adjustment key on the handheld electronic apparatus 100, the processing unit 104 receives such a volume control (step S1008), resumes the sound corresponding to the application according to the volume control, and silences the ringtone of the handheld electronic apparatus 100 (step S1010). After the processing unit 104 silences the ringtone of the handheld electronic apparatus 100, the processing unit 104 further disables the volume control of the handheld electronic apparatus 100 in step S1012. Besides, if the user answers the incoming call, the processing unit 104 silences the sound corresponding to the application executed by the processing unit 104 in step S1014. The processing unit 104 may then receive the volume control to adjust the volume of the talk in step S1016. From another perspective, if the processing unit 104 receives another incoming call (a waiting call) during one call (step S1018), and the user executes the volume control on the handheld electronic apparatus 100, the processing unit 104 performs steps S1008 to S1012, i.e., the processing unit 104 receives the volume control, silences the ringtone corresponding to the waiting call by means of the volume control, and further disables the volume control of the handheld electronic apparatus 100. After the user hangs up the call, the processing unit 104 in step S1020 resumes the sound corresponding to the application that is executed by the processing unit 104 before the incoming call is answered.

To sum up, according to an embodiment of the invention, while a call is incoming, a sub-call window interface is displayed on the operating interface of the current task, such that the user is allowed to answer or deny the call through the sub-call window interface without suspending the task that the user is performing. Besides, the sub-call window interface may be moved or hidden in a notification bar, such that the user who is performing certain tasks is not bothered by the incoming call. All these significantly facilitate the use of the handheld electronic apparatus.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. An incoming call processing method configured for a handheld electronic apparatus having a touch display screen, the incoming call processing method comprising:
receiving an incoming call;
deciding whether to display a sub-call window interface on an operating interface displayed on the touch display screen by determining whether the operating interface is a normal application operating interface, wherein the normal application operating interface includes any operating interface other than a full-screen call interface, a screen-locking interface and a standby interface;
if the operating interface is not the normal application operating interface, displaying the full-screen call interface on the touch display screen to replace the operating interface originally displayed on the touch display screen;
if the operating interface is the normal application operating interface, further determining whether the handheld electronic apparatus is preset to display the sub-call window interface;
if the handheld electronic apparatus is not preset to display the sub-call window interface, displaying the full-screen call interface on the touch display screen to replace the operating interface originally displayed on the touch display screen; and
if the handheld electronic apparatus is preset to display the sub-call window interface, displaying the sub-call window interface on the operating interface without blocking the entire operating interface, wherein the sub-call window interface at least comprises a call interface switching control key for switching between the sub-call window interface and the full-screen call interface and a sub-call window zooming control key for hiding the sub-call window interface to prevent the sub-call window interface from blocking the operating interface.

2. The incoming call processing method as recited in claim 1, further comprising performing a touch action on the sub-call window interface to move a location of the sub-call window interface on the touch display screen, the touch action comprising a sliding action.

3. A handheld electronic apparatus comprising:
a touch display screen; and
a processing unit coupled to the touch display screen, the processing unit determining, when receiving an incoming call, whether to display a sub-call window interface on an operating interface displayed on the touch display screen by determining whether the operating interface is a normal application operating interface, wherein the normal application operating interface includes any operating interface other than a full-screen call interface, a screen-locking interface and a standby interface, the processing unit controls the touch display screen to display the full-screen call interface if the operating interface is not the normal application operating interface, and determines whether the handheld electronic apparatus is preset to display the sub-call window interface if the operating interface is the normal application operating interface, the processing unit controls the touch display screen to display the full-screen call interface if the handheld electronic apparatus is not preset to display the sub-call window interface, and the processing unit controls the touch display screen to display the sub-call window interface on the operating interface if the handheld electronic apparatus is preset to display the sub-call window interface, wherein the sub-call window interface at least comprises a call interface switching control key for switching between the sub-call window interface and the full-screen call interface and a sub-call window zooming control key for hiding the sub-call window interface to prevent the sub-call window interface from blocking the operating interface.

4. The handheld electronic apparatus as recited in claim 3, wherein the processing unit further performs a touch action on the sub-call window interface to move a location of the sub-call window interface on the touch display screen, and the touch action comprises a sliding action.

* * * * *